(12) United States Patent
Tokushima

(10) Patent No.: US 6,795,621 B2
(45) Date of Patent: Sep. 21, 2004

(54) WAVEGUIDE COMPRISING A CONNECTION OF A PHOTONIC-CRYSTAL LINE-DEFECT-WAVEGUIDE TO A TOTAL REFLECTION CONFINEMENT WAVEGUIDE

(75) Inventor: Masatoshi Tokushima, Minato-ku (JP)

(73) Assignee: NEC Corporation, Tokyo (JP)

(*) Notice: Subject to any disclaimer, the term of this patent is extended or adjusted under 35 U.S.C. 154(b) by 121 days.

(21) Appl. No.: 10/162,764

(22) Filed: Jun. 6, 2002

(65) Prior Publication Data
US 2002/0191933 A1 Dec. 19, 2002

(30) Foreign Application Priority Data
Jun. 7, 2001 (JP) .......................... 2001-172042

(51) Int. Cl.$^7$ .................... G02B 6/26; G02B 6/42
(52) U.S. Cl. ................ 385/50; 385/39; 385/129; 385/141
(58) Field of Search ................ 385/39, 50, 129, 385/141

(56) References Cited

U.S. PATENT DOCUMENTS

| 6,134,369 A | * 10/2000 | Kurosawa ............... 385/132 |
| 6,381,389 B1 | * 4/2002 | Kosaka ................... 385/39 |
| 6,640,034 B1 | * 10/2003 | Charlton et al. ......... 385/122 |
| 6,643,439 B2 | * 11/2003 | Notomi et al. ........... 385/125 |
| 2002/0009277 A1 | * 1/2002 | Noda et al. .............. 385/130 |
| 2002/0150366 A1 | * 10/2002 | Loncar et al. ............ 385/125 |
| 2004/0001683 A1 | * 1/2004 | Lau et al. ................ 385/129 |

\* cited by examiner

*Primary Examiner*—Brian Healy
*Assistant Examiner*—Daniel Petkovsek
(74) *Attorney, Agent, or Firm*—Sughrue Mion, PLLC

(57) ABSTRACT

A total reflection confinement waveguide is connected to the end face of a line defect portion in a photonic-crystal line-defect-waveguide to constitute a waveguide. The photonic-crystal line-defect-waveguide comprises photonic crystal holes, which are arranged in two groups of triangular lattices within a high-permittivity medium, and a line defect portion provided at the interface of the two groups. The width of the total reflection confinement waveguide is identical to or substantially identical to the width of the line defect portion.

6 Claims, 5 Drawing Sheets

WAVEGUIDE COMPRISING A CONNECTION OF A PHOTONIC-CRYSTAL LINE-DEFECT-WAVEGUIDE TO A TOTAL REFLECTION CONFINEMENT WAVEGUIDE

FIELD OF THE INVENTION

The invention relates to a waveguide and particularly to a waveguide having a structure comprising a connection of a photonic-crystal line-defect-waveguide to a total reflection confinement waveguide, for enhancing the optical coupling efficiency.

BACKGROUND OF THE INVENTION

A photonic crystal is an artificial optical crystal of which the permittivity has been periodically and greatly modulated. The photonic crystal generally has an angular frequency zone called a "photonic band gap (PBG)" in which light cannot propagate in any direction within the photonic crystal.

FIG. 1 shows an example of the structure of a two-dimensional photonic crystal.

This two-dimensional triangular-lattice photonic-crystalline material 3 has a structure such that photonic crystal holes 2 having a very small diameter are arranged in a triangular lattice form in a high-permittivity medium 1. A semiconductor, which in many cases has a specific permittivity of about 12, is generally used as the high-permittivity medium 1. In the case of the two-dimensional triangular-lattice photonic-crystalline material 3, guidelines about a combination of the pitch (or lattice constant) of the holes with the hole diameter, which can provide PBG, are disclosed, for example, in J. D. Joannopoulos, R. D. Meade and J. N. Winn, "Photonic Crystals, Modeling the Flow of Light," Princeton University Press, pp. 125–126. For example, in the case where circular holes of a photonic crystal are arranged in a triangular lattice form on a dielectric substrate having a permittivity of 11.4, PBG occurs regardless of the direction of vibration of electric field and the direction in which the holes elongate, when the following requirements are met: $(r/a)=0.48$; and $\{(\omega \times a)/(2\pi \times c)\}=$ about 0.5, wherein r represents the radius of holes, a represents the pitch of circular holes of the photonic crystal, $\omega$ represents the angular frequency of light, and c represents the speed of light in vacuum.

FIG. 2 shows an example of a photonic-crystal line-defect-waveguide which has been prepared using the two-dimensional triangular-lattice photonic-crystalline material 3 shown in FIG. 1.

This photonic-crystal line-defect-waveguide 5 has a structure such that two two-dimensional triangular-lattice photonic-crystalline materials 3 of the type shown in FIG. 1 are disposed close to each other. A large number of holes 2 are arranged in a triangular lattice form in a high-permittivity medium 1. One row of non-hole portion, that is, a line defect portion 4, is provided in a middle portion between the large number of holes 2. In this case, light of angular frequency within PBG cannot propagate through the fully crystallized portion other than the line defect portion 4, but can propagate through the line defect portion 4. That is, the line defect portion 4 functions as a waveguide.

The photonic-crystal line-defect-waveguide 5 shown in FIG. 2 can lead light and, in addition, as a result of a reflection of the properties of the photonic crystal, has other properties such as small group velocity or wavelength dispersion. Therefore, the formation of an optical device utilizing the above properties is considered. When attention is directed only to properties as a waveguide for leading light, however, the photonic-crystal line-defect-waveguide 5 is sometimes inferior to the total reflection confinement waveguide.

FIG. 3 shows a construction of a total reflection confinement waveguide. As with an optical fiber, the total reflection confinement waveguide 10 can lead light, which has been introduced into one end, to other end. The total reflection confinement waveguide 10 is a dielectric line having a smooth surface, has a simple structure, and undergoes a less structural fluctuation than the photonic-crystal line-defect-waveguide 5 shown in FIG. 2 and, thus, is easy to prepare a form as designed. Therefore, a waveguide having a lower loss than the photonic-crystal line-defect-waveguide 5 can be easily prepared. Since, however, properties such as small group velocity and wavelength dispersion. in the total reflection confinement waveguide 10 are not significant as compared with those possessed by the photonic-crystal line-defect-waveguide 5, the connection of the photonic-crystal line-defect-waveguide 5 to the channel waveguide is considered effective for utilizing mutual advantages of the total reflection confinement waveguide 10 and the photonic-crystal line-defect-waveguide 5.

FIG. 4 shows a conventional waveguide. The construction of this waveguide is such that the total reflection confinement waveguide shown in FIG. 3 is connected to the photonic-crystal line-defect-waveguide shown in FIG. 2.

The end face of the total reflection confinement waveguide 10 as a channel waveguide is connected to the end face 11 of the line defect portion 4 in the photonic-crystal line-defect-waveguide 5 having the structure shown in FIG. 2. The end face 11 of the line defect portion 4 is flat in a portion close to the line defect portion, including the line defect portion 4 and the portion other than the line defect portion 4. The angle of the connections 14, 15 of the surfaces 12, 13 of the total reflection confinement waveguide 10 to the end face 11 of the photonic-crystal line-defect-waveguide 5 is 90 degrees. The total reflection confinement waveguide 10 is formed of a high-permittivity medium 16 which is identical to the high-permittivity medium 1 of the photonic-crystal line-defect-waveguide 5.

Since the total reflection confinement waveguide 10 is formed of the high-permittivity medium 16, the confinement of light in the total reflection confinement waveguide 10 is significant and the width of the lateral distribution (profile) of light, which propagates through the total reflection confinement waveguide 10, is substantially equal to the width of the total reflection confinement waveguide 10. A part of light, which propagates through the photonic-crystal line-defect-waveguide 5, however, is spread from the line defect portion 4 to the horizontal hole row. In order to match the profile of light, which propagates through the total reflection confinement waveguide 10, with the profile of the spread light, the width of the total reflection confinement waveguide 10 is made larger than that of the photonic-crystal line-defect-waveguide 5.

According to the conventional waveguide, however, in the connection between the total reflection confinement waveguide 10 and the photonic-crystal line-defect-waveguide 5, since the width of the total reflection confinement waveguide 10 is larger than that of the photonic-crystal line-defect-waveguide 5, the portion around the renter of the total reflection confinement waveguide 10 is kept continuous with the portion around the center (around the line defect portion 4) of the photonic-crystal line-defect-waveguide 5. On the other hand, in the peripheral portion apart from the center of the total reflection confinement waveguide 10, since a uniform structure on the total reflection confinement waveguide 10 side is connected to a periodic arrangement structure of holes on the photonic-crystal line-defect-waveguide 5 side, the structure of the peripheral becomes discontinuous. The photonic crystal per se does not permit the transmission of light with angular frequency within PBG, and, thus, the electromagnetic field energy of light distributed outside the width of the line defect portion 4 in the total reflection confinement waveguide 10 is disadvantageously reflected from a portion around the end face 11 of the photonic-crystal line-defect-waveguide 5 and thus cannot enter the photonic-crystal line-defect-waveguide 5. For this reason, a combination of the total reflection confinement waveguide 10 with the photonic-crystal line-defect-waveguide 5 has a problem that, despite the fact that they are close to each other in the profile of the propagation light, the optical coupling efficiency is poor.

SUMMARY OF THE INVENTION

Accordingly, it is an object of the invention to provide a waveguide which can realize a connection of a total reflection confinement waveguide to a photonic-crystal line-defect-waveguide with high optical coupling efficiency.

According to the first feature of the invention, a waveguide comprises: a photonic-crystal line-defect-waveguide comprising a high-permittivity medium, holes arranged in two groups of holes in a predetermined pattern within the high-permittivity medium, and a hole-free line defect portion provided at the interface of the two groups; and a total reflection confinement waveguide which has a width identical to or substantially identical to the width of the line defect portion in the photonic-crystal line-defect-waveguide and is connected to the end face of the line defect portion.

According to this construction, the width of a line defect portion provided on the photonic-crystal line-defect-waveguide is identical to or substantially identical to the width of the total reflection confinement waveguide connected to the line defect portion. By virtue of this construction, coupling loss attributable to reflection in the connection between the photonic-crystal line-defect-waveguide and the total reflection confinement waveguide can be reduced, and the optical coupling efficiency can be enhanced.

According to the second feature of the invention, a waveguide comprises: a photonic-crystal line-defect-waveguide comprising a high-permittivity medium, holes arranged in two groups of holes in a predetermined pattern within the high-permittivity medium, and a hole-free line defect portion provided at the interface of the two groups, one row of holes among the holes arranged along one side face of the line defect portion having been cut into a semicircular form; and a total reflection confinement waveguide which has a width identical to or substantially identical to the width of the line defect portion in the photonic-crystal line-defect-waveguide and is connected to the end face of the line defect portion.

According to this construction, the width of a line defect portion provided on the photonic-crystal line-defect-waveguide is identical to or substantially identical to the width of the total reflection confinement waveguide connected to the line defect portion. By virtue of this construction, coupling loss attributable to reflection in the connection between the photonic-crystal line-defect-waveguide and the total reflection confinement waveguide can be reduced, and the optical coupling efficiency can be enhanced. Further, in the photonic-crystal line-defect-waveguide, one row of the photonic crystal along the side face, to which the total reflection confinement waveguide is connected, is cut into a semicircle. By virtue of this, the end face of the line defect portion does not spread in the widthwise direction, and loss attributable to leakage onto the photonic crystal surface can be reduced.

According to the third feature of the invention, a waveguide comprises: a total reflection confinement waveguide having predetermined width and length; and a photonic-crystal line-defect-waveguide comprising a high-permittivity medium, holes arranged in two groups of holes in a predetermined pattern within the high-permittivity medium, and a hole-free line defect portion, with a width identical to or substantially identical to the width of the total reflection confinement waveguide, provided at the interface of the two groups, one end of the total reflection confinement waveguide having been connected to the line defect portion, the high-permittivity medium having been projected toward both sides of the total reflection confinement waveguide to form a protective portion.

According to this construction, the width of a line defect portion provided on the photonic-crystal line-defect-waveguide is identical to or substantially identical to the width of the total reflection confinement waveguide connected to the line defect portion. By virtue of this construction, coupling loss attributable to reflection in the connection between the photonic-crystal line-defect-waveguide and the total reflection confinement waveguide can be reduced, and the optical coupling efficiency can be enhanced. Further, the formation of a protective portion so as to embed both sides of the total reflection confinement waveguide can reduce the optical coupling loss and, at the same time, can increase the mechanical strength of the photonic crystal near the connection between the photonic-crystal line-defect-waveguide and the total reflection confinement waveguide.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

Figure 5:
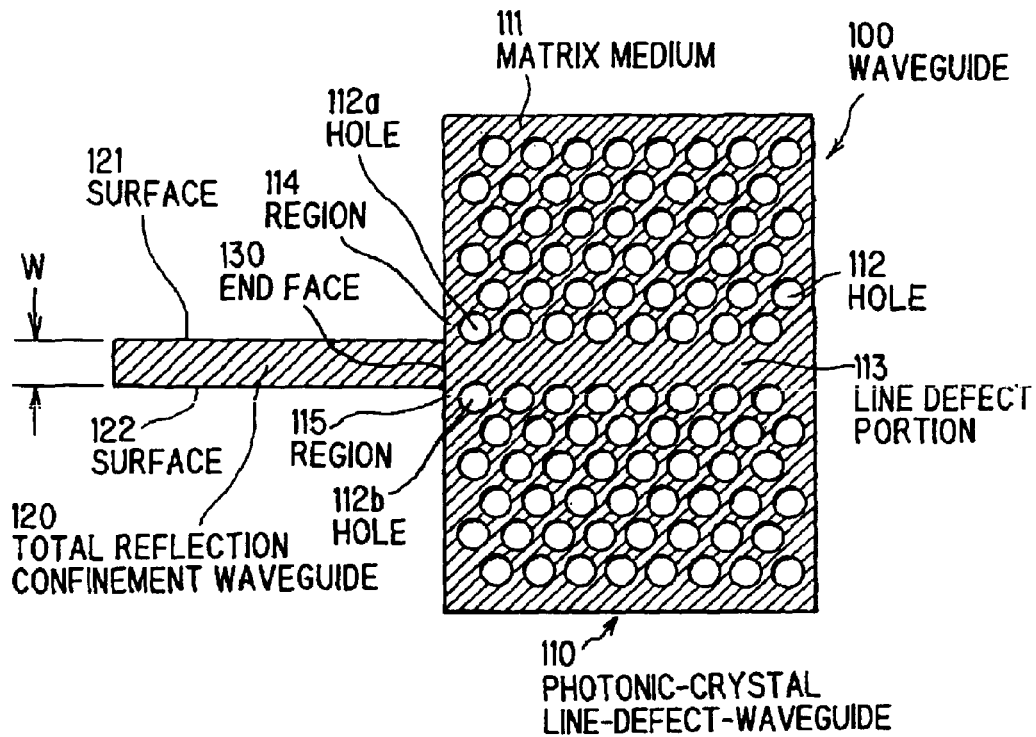
FIG. 5 is a cross-sectional view showing a first preferred embodiment of the invention.

FIG. 5 is a waveguide in a first preferred embodiment of the invention. The waveguide according to this preferred embodiment comprises a line defect waveguide formed of a two-dimensional triangular-lattice photonic-crystal connected to a total reflection confinement waveguide.

A waveguide 100 according to the invention comprises a photonic-crystal line-defect-waveguide 110 and a total reflection confinement waveguide 120. The total reflection confinement waveguide 120 is connected, on a straight line, to the end face 130 of the photonic-crystal line-defect-waveguide 110. The photonic-crystal line-defect-waveguide 110 comprises a matrix medium (a high-permittivity medium) 111 and a large number of photonic crystal holes 112 arranged in a triangular lattice form provided in the matrix medium 111. In this case, holes 112 are not provided in a middle portion with a predetermined width of the matrix medium 111, and, in this portion, a line defect portion 113 is provided. A semiconductor (generally silicon having a specific permittivity of about 12) is used as the matrix medium 111. The total reflection confinement waveguide 120 is formed of a material, which is identical to the matrix medium 111, and has a width W which is substantially identical to the width of the line defect portion 113.

One end face of the total reflection confinement waveguide 120 is connected to the side face (end face 130) of the line defect portion 113. In this case, the total reflection confinement waveguide 120 is connected on a straight line (on an identical axis) to and so as to be coplanar with the line defect portion 113. The surfaces (side faces) 121, 122 of the total reflection confinement waveguide 120 are normal to or substantially normal to the end face 130.

Figure 1:
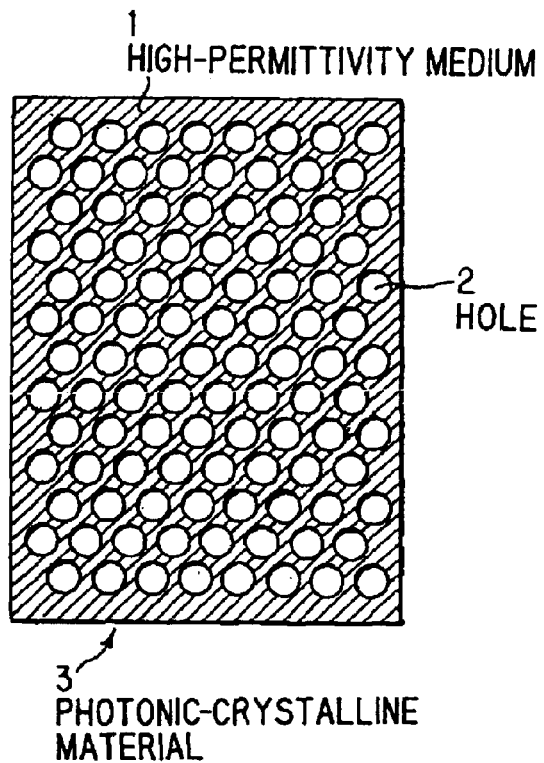
FIG. 1 is a cross-sectional view showing an example of the structure of a two-dimensional photonic crystal.
Figure 2:
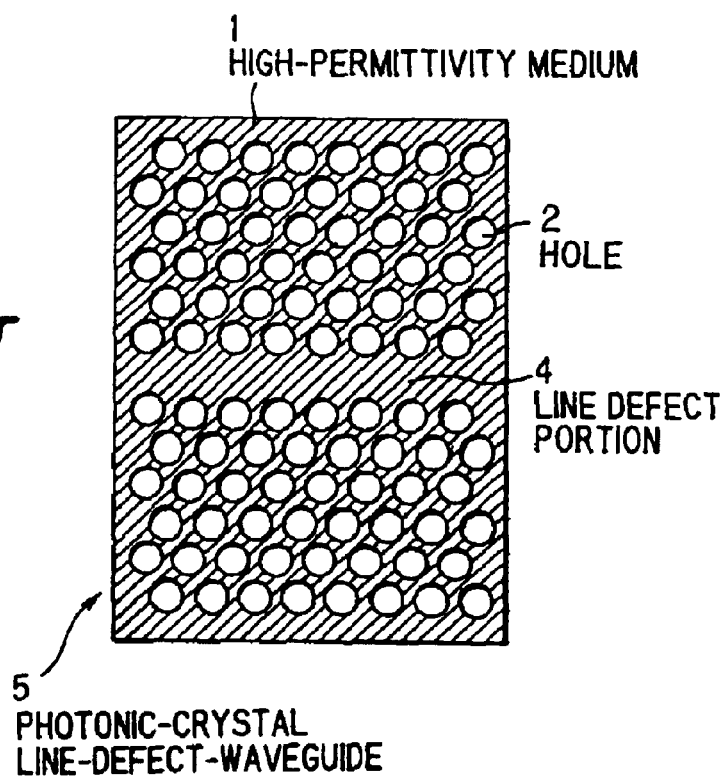
FIG. 2 is a cross-sectional view showing an example of a photonic-crystal line-defect-waveguide.
Figure 3:
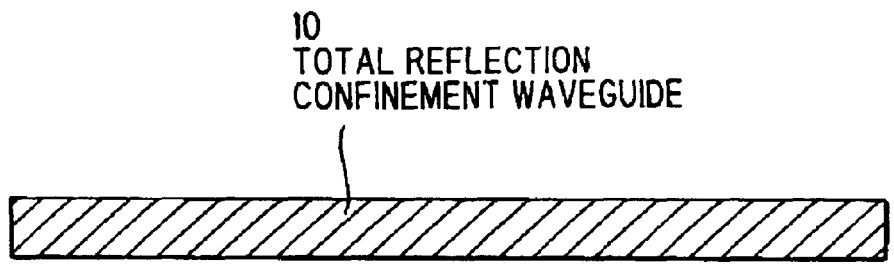
FIG. 3 is a cross-sectional view showing the structure of a total reflection confinement waveguide.
Figure 4:
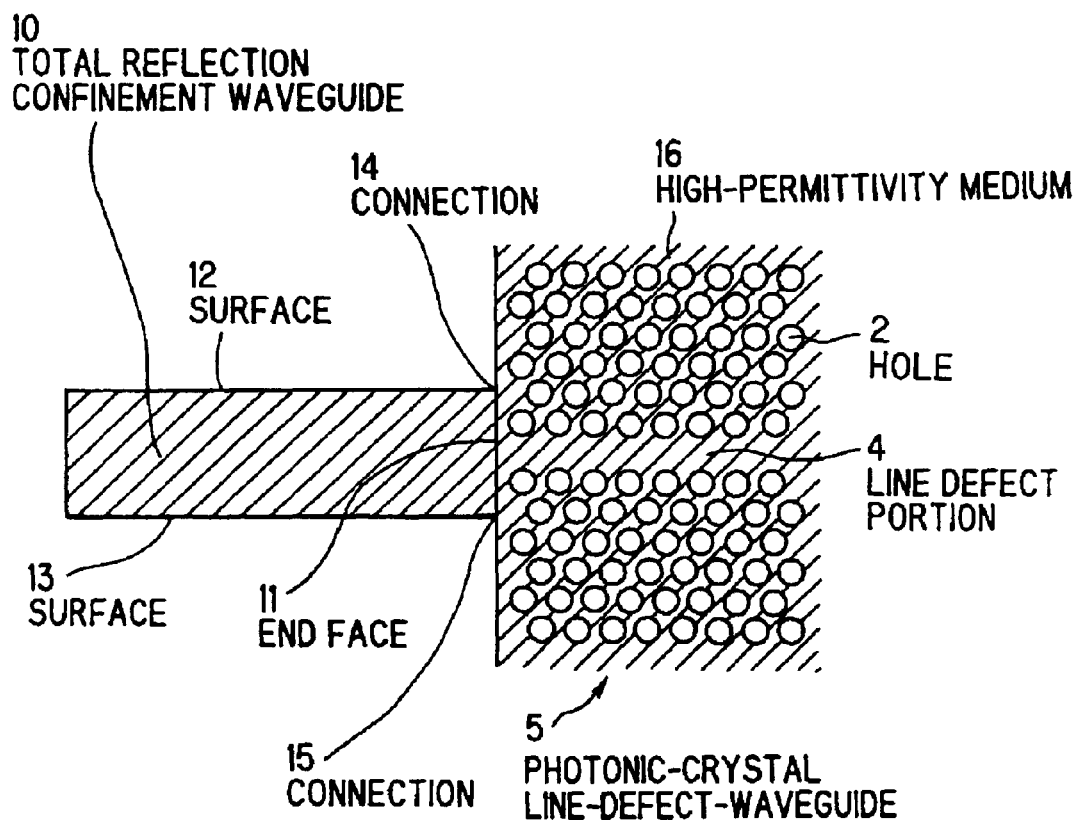
FIG. 4 is a cross-sectional view showing a conventional waveguide.

In the construction shown in FIG. 5, the total reflection confinement waveguide 120 has a width W substantially identical to the width of the line defect portion 113 in the photonic-crystal line-defect-waveguide 110, is formed of a material identical to the material of the line defect portion 113, and is continuous with the line defect portion 113. Therefore, light, which has propagated through the total reflection confinement waveguide 120, substantially entirely enters the line defect portion 113 in the photonic-crystal line-defect-waveguide 110. The light, which has entered the line defect portion 113, is diffracted by holes 112 arranged around the line defect portion 113. In this case, the proportion of light, which is diffracted in a direction opposite to the incident direction of light propagated from the total reflection confinement waveguide 120, and is returned as reflected light to the total reflection confinement waveguide 120 is lower than that of diffracted returned light in the structure shown in FIG. 3 which has a preference for matching of the profile of the propagation light. Consequently, the optical coupling efficiency in the invention is higher than that in the prior art.

A specific example corresponding to the first preferred embodiment of the invention will be explained.

Silicon (Si) having a permittivity of 11.4 was used as the matrix material (matrix medium 111) of the photonic-crystal line-defect-waveguide 110. The pitch of triangular lattices (holes 112) was 0.7 $\mu$m, the diameter of the holes 112 was 0.64 $\mu$m, and, further, the width of the line defect portion 113 was 0.57 $\mu$m. The width W of the total reflection confinement waveguide 120 was identical to the width of the line defect portion 113 and was 0.57 $\mu$m. The distance between the end face 130 of the photonic-crystal line-defect-waveguide 110 and the hole 112 closest to the end face 130 (regions 114, 115) was 0.06 $\mu$m.

Numerical calculation simulation was carried out based on the dimension of each section. As a result, for light with angular frequency within PBG, the loss of coupling of the photonic-crystal line-defect-waveguide 110 with the total reflection confinement waveguide 120 was 0.5 dB. On the other hand, in the case of a conventional structure which has the same structure and numerical dimension values as described above except that the width of the total reflection confinement waveguide 120 was 2.2 $\mu$m, the coupling loss for light with the same angular frequency as used above was 2.3 dB. This indicates that a 1.8 dB reduction in coupling loss could be achieved by the invention over the prior art technique.

Figure 6:
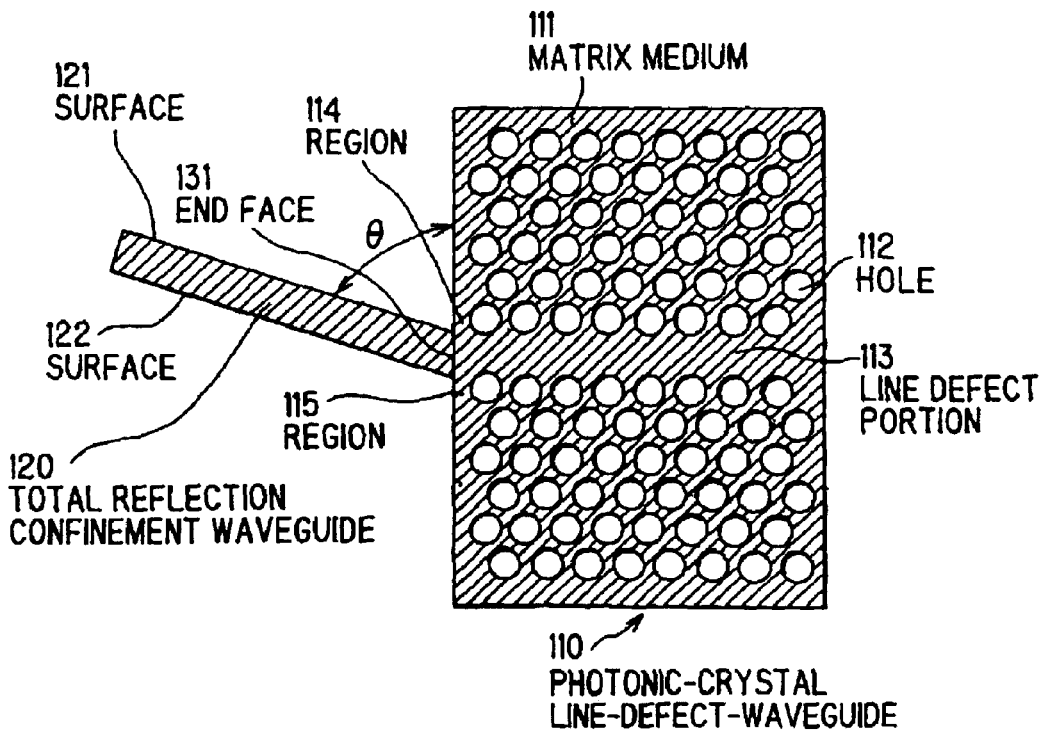
FIG. 6 is a cross-sectional view showing a variant of the waveguide shown in FIG. 5.

FIG. 6 shows a variant of the waveguide shown in FIG. 5. In FIGS. 5 and 6, like parts are identified with the same reference numerals, and overlapped explanation will be omitted.

In FIG. 5, the angle of the connection of the line defect portion 113 to the total reflection confinement waveguide 120 as 0 (zero) degree, that is, the total reflection confinement waveguide 120 was connected to the line defect portion 113 on a straight line. On the other hand, in this preferred embodiment, the line defect portion 113 is connected to the total reflection confinement waveguide 120 at a certain angle θ. When the total reflection confinement waveguide 120 and the photonic-crystal line-defect-waveguide 110 are different from each other in wavenumber distribution in the widthwise direction of the waveguide, the provision of the angle θ can improve the matching of the wavenumber distribution and can often improve the optical coupling efficiency.

Figure 7:
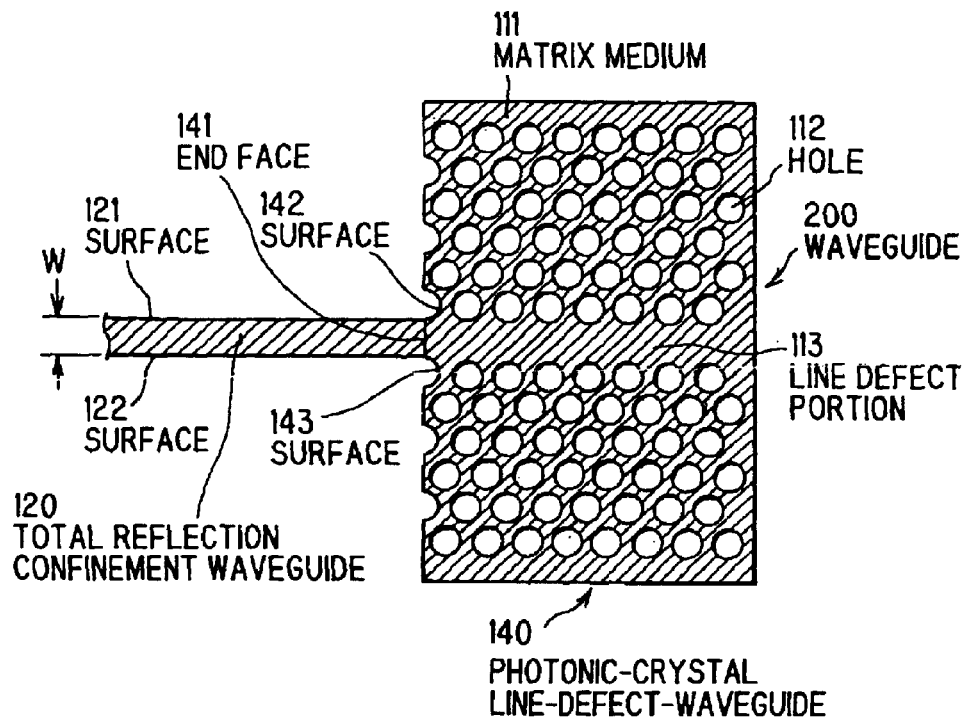
FIG. 7 is a cross-sectional view showing a second preferred embodiment of the invention.

FIG. 7 shows a second preferred embodiment of the invention. In FIGS. 5 and 7, like parts are identified with the same reference numerals, and overlapped explanation thereof will be omitted.

In the structure according to the first preferred embodiment, the distance between the end face 130 of the photonic-crystal line-defect-waveguide 110 and the holes 112a, 112b closest to the end face 130 is important for improving the efficiency of optical coupling between the total reflection confinement waveguide 120 and the photonic-crystal line-defect-waveguide 110. When this distance is large, the distance between the total reflection confinement waveguide 120 and the line defect portion 113 in the photonic-crystal line-defect-waveguide 110 is large. In this case, a part of light, which has propagated through the total reflection confinement waveguide 120, enters the regions 114, 115 between the end face 130 and the row of holes 112a, 112b closest to the end face 130, and this deteriorates the optical coupling efficiency. The second preferred embodiment shown in FIG. 7 can solve this problem.

As shown in FIG. 7, a photonic crystal including the line defect portion 113, that is, the end face 141 of a photonic-crystal line-defect-waveguide 140, is a face which crosses the line defect portion 113 and cuts each hole 112, in the photonic-crystal line-defect-waveguide 140, near the total reflection confinement waveguide 120 so as to cross the holes 112. The total reflection confinement waveguide 120 is connected to the end face 141 in its line defect portion 113. The width W of the total reflection confinement waveguide 120 is equal to or substantially equal to the width of the line defect portion 113. The surfaces 142, 143 of semicircular holes located on both sides of the end face 141 in its line defect portion 113 are smoothly connected to the surfaces 121, 122 of the total reflection confinement waveguide 120.

According to the preferred embodiment shown in FIG. 7, the end face 141, of the photonic-crystal line-defectwaveguide 140, connected to the total reflection confinement waveguide 120 has a structure which is not spread toward the side face (the widthwise direction of the line defect portion 113 or the vertical direction in the drawing). Therefore, there is no fear that a part of the light propagated through the total reflection confinement waveguide 120 leaks onto the crystal surface at a portion close to the line defect portion 113 in the photonic-crystal line-defect-waveguide 140. This contributes to reduced optical coupling loss.

Figure 8:
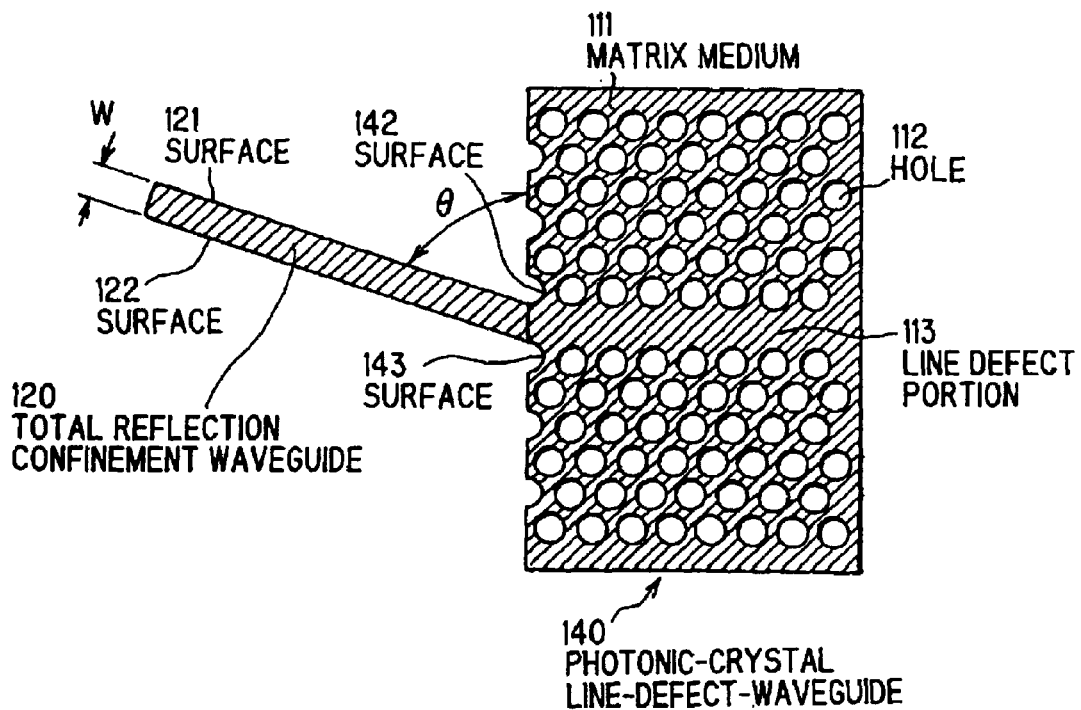
FIG. 8 is a cross-sectional view showing a variant of the waveguide shown in FIG. 7.

FIG. 8 shows a variant of the waveguide shown in FIG. 7. In FIGS. 5 to 8, like parts are identified with the same reference numerals, and overlapped explanation thereof will be omitted.

In FIG. 7, the angle of the connection of the line defect portion 113 to the total reflection confinement waveguide 120 is 0 (zero) degree, that is, the line defect portion 113 is connected to the total reflection confinement waveguide 120 on a straight line. The line defect portion 113 may be connected to the total reflection confinement waveguide 120 at an angle θ as shown in FIG. 8. In this case, as with the embodiment shown in FIG. 6, when the total reflection confinement waveguide 120 and the photonic-crystal line-defect-waveguide 140 are different from each other in wavenumber distribution in the widthwise direction of the waveguide, the provision of this angle θ often contributes to improved optical coupling efficiency.

Here a specific example corresponding to the second preferred embodiment of the invention will be explained.

Silicon (Si) having a permittivity of 11.4 was used as the matrix material (matrix medium) of the photonic-crystal line-defect-waveguide 140. The pitch of triangular lattices (holes 112) was 0.7 μm, and the diameter of the holes 112 was 0.64 μm. In this case, the width of the line defect portion 113 was 0.57 μm. The width W of the total reflection confinement waveguide 120 was identical to the width of the line defect portion 113 and was 0.57 μm.

Numerical calculation simulation was carried out based on the dimension of each section. As a result, for light with angular frequency within PBG, the loss of coupling of the photonic-crystal line-defect-waveguide 140 with the total reflection confinement waveguide 120 was 0.3 dB. That is, a 0.2 dB reduction in coupling loss could be achieved by this preferred embodiment over the coupling loss 0.5 dB in the first preferred embodiment.

In FIG. 7, in the connection of the total reflection confinement waveguide 120 to the photonic-crystal line-defect-waveguide 140, the cleavage surface of the photonic crystal is exposed in the portion other than the end face 141 in its line defect portion 113. This is true of the preferred embodiment shown in FIG. 8. The structure, in which the cleavage surface of the photonic crystal is exposed, sometimes poses a problem of low mechanical strength. A structure, which can solve this problem, will be explained.

Figure 9:
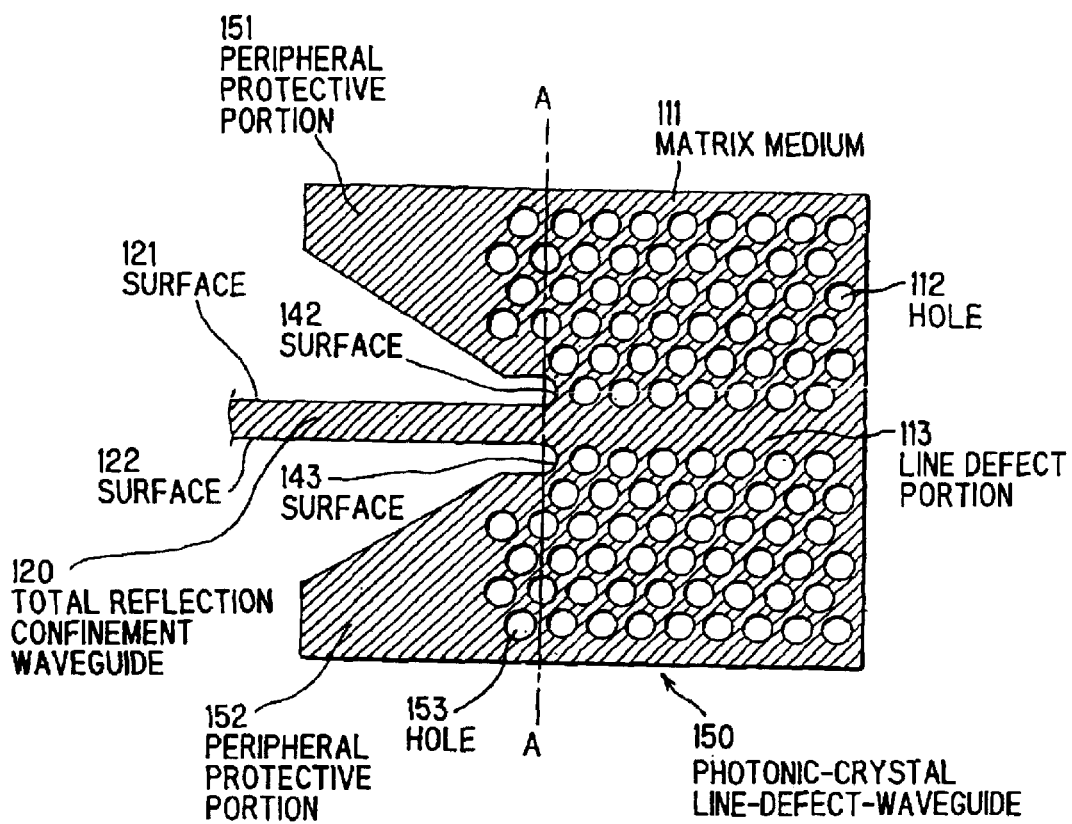
FIG. 9 is a cross-sectional view showing a third preferred embodiment of the invention.

FIG. 9 shows a waveguide according to the third preferred embodiment of the invention. In this waveguide, the mechanical strength of the cleavage surface of the photonic crystal has been enhanced.

The structure shown in FIG. 9 is the same as that shown in FIG. 5 (or FIG. 7), except that peripheral protective portions 151, 152 consisting of the matrix medium 111 alone and free from holes 112 are additionally provided around the photonic crystal in its portion other than the connection to the total reflection confinement waveguide 120 to constitute a photonic-crystal line-defect-waveguide 150. Since the mechanical strength of the peripheral protective portions 151, 152 is higher than that of the hole-containing photonic crystal portion, the peripheral protective portions 151, 152 can prevent the photonic crystal portion from being broken.

Further, the structure shown in FIG. 9 can further reduce the optical coupling loss as compared with the connection structure shown in FIG. 7. The right side from the A–A' face in FIG. 9 is the same as the photonic-crystal line-defect-waveguide 140 shown in FIG. 7. In FIG. 9, however, also on a side closer to the total reflection confinement waveguide 120 side (left side of FIG. 9) rather than the A–A' face, that is, rather than a face which passes through the position at which the total reflection confinement waveguide 120 is connected to the photonic-crystal line-defect-waveguide 150, a plurality of photonic crystal holes 153 are provided on the base of the peripheral protective portions 151, 152.

According to this construction, the proportion of light, from the total reflection confinement waveguide 120, which enters the line defect portion 113, is then diffracted by holes 112 arranged around the line defect portion 113, is passed through holes 112 arranged on both sides of the line defect portion 113, and is radiated from the surface on the total reflection confinement waveguide 120, is reduced. This can reduce the optical coupling loss of the connection between the photonic-crystal line-defect-waveguide 150 and the total reflection confinement waveguide 120.

Here a specific example corresponding to the structure shown in FIG. 9 according to the invention will be explained.

Silicon (Si) having a permittivity of 11.4 was used as the matrix material (matrix medium) of the photonic-crystal line-defect-waveguide 150. The pitch of triangular lattices (holes 112) was 0.7 μm, the diameter of the holes 112 was 0.64 μm, and the width of the line defect portion 3 was 0.57 μm.

Numerical calculation simulation was carried out based on the dimension of each section. As a result, the coupling loss was 0.2 dB. This indicates that, according to this embodiment, the coupling loss could be further reduced by 0.1 dB from the coupling loss 0.3 dB in the second preferred embodiment of the invention described above.

Also in FIG. 9, as shown in FIG. 6 or 8, the total reflection confinement waveguide 120 may be obliquely connected to the photonic-crystal line-defect-waveguide 150 to further reduce the coupling loss.

In each of the preferred embodiments, a two-dimensional photonic crystal has been explained. It is needless to say that, the invention can also be applied to a slab-type photonic crystal which is a pseudo-two-dimensional photonic crystal. In this case, since the total reflection confinement waveguide also has a finite thickness, the waveguide is called a "channel waveguide."

Figure 10:
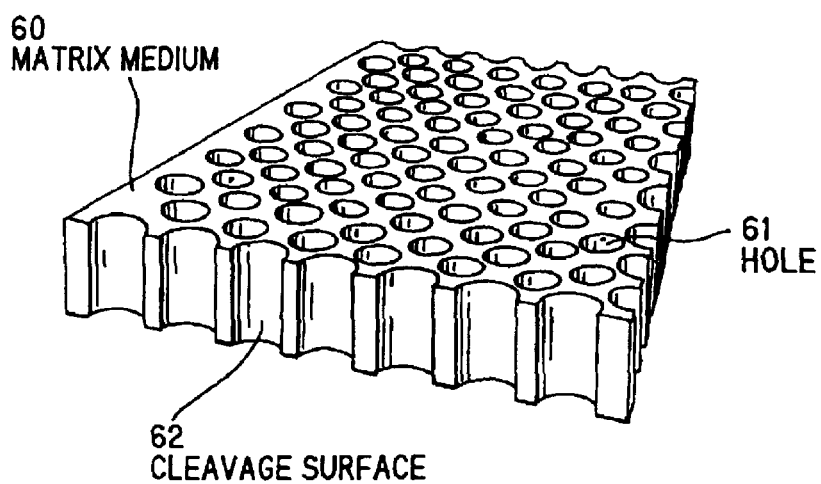
FIG. 10 is a perspective view showing a slab-type photonic crystal.

FIG. 10 shows the structure of a slab-type photonic crystal. In the drawing, numeral 60 designates a matrix medium, numeral 61 holes, and numeral 62 a cleavage surface. Also in the case of the photonic crystal having a finite thickness, the cross-section of the connection between the total reflection confinement waveguide and the photonic-crystal line-defect-waveguide according to the invention is the same as that of the two-dimensional photonic crystal.

Further, in the preferred embodiments, a triangular-lattice photonic-crystal has been explained. However, it is apparent that the invention is also applicable to photonic crystals having lattices which are slightly different from triangular lattices, for example, square lattices, rectangular lattices, or rhombic lattices.

Further, in the above preferred embodiments, only one row of line defect is used as the line defect portion of the photonic-crystal line-defect-waveguide. However, it is needless to say that the invention is also applicable to a wide line defect portion constituted by two or more rows of line defects. Further, in the above examples, silicon (Si) is used as the matrix material (matrix medium). It is needless to say that other materials, particularly compound semiconductors, may be used.

As described above, according to the invention, in a waveguide comprising a total reflection confinement waveguide connected to a photonic-crystal line-defect-waveguide, the width of a line defect portion provided on the photonic-crystal line-defect-waveguide is identical to or substantially identical to the width of the total reflection confinement waveguide connected to the line defect portion. By virtue of this construction, coupling loss attributable to reflection in the connection between the photonic-crystal line-defect-waveguide and the total reflection confinement waveguide can be reduced, and the optical coupling efficiency can be enhanced.

According to another waveguide of the invention, the width of a line defect portion provided on the photonic-crystal line-defect-waveguide is identical to or substantially identical to the width of the total reflection confinement waveguide connected to the line defect portion. By virtue of this construction, coupling loss attributable to reflection in the connection between the photonic-crystal line-defect-waveguide and the total reflection confinement waveguide can be reduced, and, thus, the optical coupling efficiency can be enhanced. Further, in the photonic-crystal line-defect-waveguide, one row of the photonic crystal along the side face, to which the total reflection confinement waveguide is connected, is cut into a semicircle. By virtue of this construction, the end face of the line defect portion does not spread in the widthwise direction, and loss attributable to leakage onto the photonic crystal surface can be reduced.

Further, according to a further waveguide of the invention, the width of a line defect portion provided on the photonic-crystal line-defect-waveguide is identical to or substantially identical to the width of the total reflection confinement waveguide connected to the line defect portion. By virtue of this construction, coupling loss attributable to reflection in the connection between the photonic-crystal line-defect-waveguide and the total reflection confinement waveguide can be reduced, and the optical coupling efficiency can be enhanced. Further, the formation of a protective portion so as to embed both sides of the total reflection confinement waveguide can reduce the optical coupling loss and, at the same time, can increase the mechanical strength of the photonic crystal near the connection between the photonic-crystal line-defect-waveguide and the total reflection confinement waveguide.

The invention has been described in detail with particular reference to preferred embodiments, but it will be understood that variations and modifications can be effected within the scope of the invention as set forth in the appended claims.

What is claimed is:

1. A waveguide comprising:
    a photonic-crystal line-defect-waveguide comprising a high-permittivity medium, holes arranged in two groups of holes in a predetermined pattern within the high-permittivity medium, and a hole-free line defect portion provided at the interface of the two groups; and
    a total reflection confinement waveguide which has a width identical to or substantially identical to the width of the line defect portion in the photonic-crystal line-defect-waveguide and is connected to the end face of the line defect portion;
    wherein the total reflection confinement waveguide is connected to the line defect portion at a given angle to the axis of the line defect portion.

2. The waveguide according to claim 1, wherein the total reflection confinement waveguide is formed of a high-permittivity medium which is identical to a high-permittivity medium of the photonic-crystal line-defect-waveguide.

3. A waveguide comprising:
    a photonic-crystal line-defect-waveguide comprising a high-permittivity medium, holes arranged in two groups of holes in a predetermined pattern within the high-permittivity medium, and a hole-free line defect portion provided at the interface of the two groups, one row of holes among the holes arranged along one side face of the line defect portion having been cut into a semicircular form; and
    a total reflection confinement waveguide which has a width identical to or substantially identical to the width of the line defect portion in the photonic-crystal line-defect-waveguide and is connected to the end face of the line defect portion.

4. The waveguide according to claim 3, wherein the total reflection confinement waveguide is connected to the line defect portion on an identical axis, or is connected to the line defect portion at a given angle to the axis of the line defect portion.

5. A waveguide comprising:
    a total reflection confinement waveguide having predetermined width and length; and
    a photonic-crystal line-defect-waveguide comprising a high-permittivity medium, holes arranged in two groups of holes in a predetermined pattern within the high-permittivity medium, and a hole-free line defect portion, with a width identical to or substantially identical to the width of the total reflection confinement waveguide, provided at the interface of the two groups, one end of the total reflection confinement waveguide having been connected to the line defect portion, the high-permittivity medium having been projected toward both sides of the total reflection confinement waveguide to form a protective portion.

6. The waveguide according to claim 5, wherein the total reflection confinement waveguide is connected to the line defect portion at a given angle to the axis of the line defect portion.

* * * * *